INVENTORS.
GEORGE B. HARES
DAVID W. MORGAN
CLYDE H. STOREY

BY *Gerhard K. Adam*

ATTORNEY

INVENTORS.
GEORGE B. HARES
DAVID W. MORGAN
CLYDE H. STOREY

BY
Gerhard K. Adam
ATTORNEY

METHOD OF MAKING BLUISH-GREEN BOROSILICATE GLASSES

George B. Hares and David W. Morgan, Corning, N.Y., and Clyde H. Storey, Harrodsburg, Ky., assignors to Corning Glass Works, Corning, N.Y., a corporation of New York
Filed May 11, 1967, Ser. No. 637,677
Int. Cl. C03b 25/02
U.S. Cl. 65—30                              9 Claims

ABSTRACT OF THE DISCLOSURE

This invention relates to bluish-green borosilicate glasses in which the primary coloring agent is chromic oxide and more particularly it relates to a method of changing the color of the glass by means of a heat treatment from yellowish green to bluish green.

---

Colored lamps are conventionally made by coating the outside surface of the glass bulb with ceramic enamels or sprayed lacquers. The bulk of the envelopes for these incandescent lamps are made from lime glass. But for higher wattages, smaller bulbs, or outdoor applications low expansion glasses must be used to make lamps which are resistant to thermal shock. In this category are special reflector lamps, for example PAR (parabolic aluminized reflectors) lamps, available in a variety of colors which are used as spotlights or floodlights. Such lamps have high light output and are subject to considerable change in temperature. Particularly suitable in meeting the lamp envelop requirements are borosilicate glasses used in making pressed glass parts, such as the reflectors and lenses of the PAR bulbs.

In making colored display lights, coloring agents have been melted directly into the borosilicate glass during the glass-forming operation. A color which has presented particular difficulty is bluish green. The use of chromium and its compounds in coloring glasses is discussed by W. A. Weyl in Coloured Glasses, Dawsons of Pall Mall, London, 1959, 132–148. Referring to the effect of chromium in boric oxide containing glasses, Weyl reported that when increasing amounts of boric oxide are added to a sodium silicate glass containing about 1 percent by weight $Cr_2O_3$, the deepening of the yellowish-green color occurs until it becomes olive green with 15–20 percent by weight $B_2O_3$. The shift in color is thus described to be toward the red portion of the spectrum. Attempts to make bluish-green glasses using chromic oxide as the coloring agent for borosilicate glasses gave poor reproducibility and frequently the color obtained was an unacceptable yellowish green. The technique for producing the desired bluish-green color was heretofore to a large extent a matter of trial and error.

It is therefore an object of the present invention to provide a method of making a bluish-green colored borosilicate glass containing $Cr_2O_3$ as the primary coloring agent.

A further object is to provide a method of changing the color of $Cr_2O_3$ containing borosilicate glasses from yellowish green to bluish green.

In accordance with the present invention, we have discovered a method of making bluish-green colored borosilicate glass containing chromic oxide as the principal coloring agent by subjecting the glass to a post-forming heat treatment at a temperature of 525–750° C. for a sufficient time. The glass is melted using conventional techniques and then conventionally formed into a shaped body or article such as a lens for the PAR lamp, having an initial yellowish-green color. Thereafter the article is subjected to a post-forming heat treatment in a lehr or oven whereby the color is changed to bluish green. Finally the article is conventionally annealed.

This invention will be more clearly understood from the following description taken in conjunction with the accompanying drawing in which.

Figure 1:
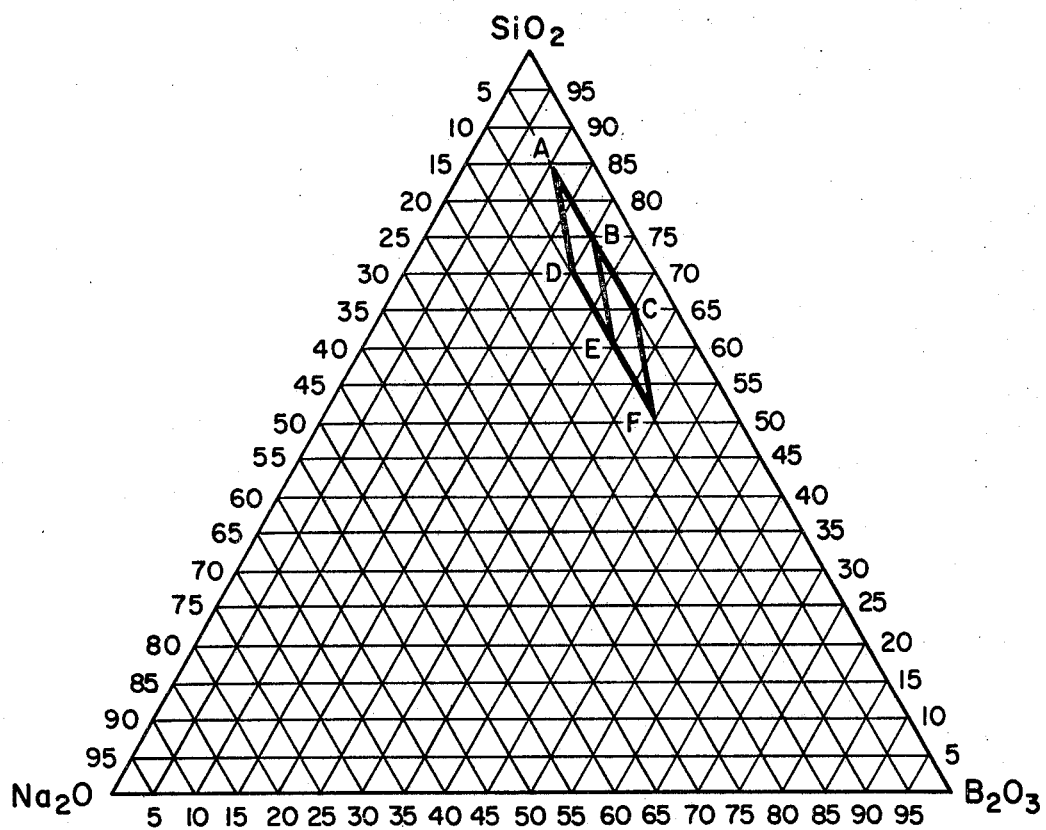
FIGURE 1 is a ternary diagram for the base glass system $Na_2O$—$B_2O_3$—$SiO_2$ useful in forming the glasses of the present invention.

Referring now to FIGURE 1, the ternary diagram sets forth the basic three component system, $$Na_2O—B_2O_3—SiO_2$$

in terms of mole percent useful in forming the glasses of the present invention. This composition is defined broadly as within the area ACFD. It should be noted that this area is divided into two portions by the line BE which is used to indicate the effects of small amounts of $Al_2O_3$ on the ability of the glass to undergo the desired color change. Thus in the presence of $Al_2O_3$ the borosilicate glass undergoes the color change in the portion designated as ABED wherein the molar ratio of $B_2O_3:Na_2O$ is in the range of about 2:1–4:1. However in the absence of $Al_2O_3$ the borosilicate glass only undergoes the color change in the portion designated as BCFE wherein the molar ratio of $B_2O_3:Na_2O$ is about 3:1–6:1. Broadly the glass composition useful for the method of the present invention is as follows:

| Oxide | Mole percent | Weight percent |
|---|---|---|
| $Na_2O$ | 4.5–10 | 4.43–9.62 |
| $B_2O_3$ | 10–40 | 11.22–43.21 |
| $SiO_2$ | 50–85 | 46.6–81.6 |
| $Al_2O_3$ | 0–4.4 | 0–7 |
| $Cr_2O_3$ | 0.08–0.24 | 0.2–0.6 |

Furthermore, the molar range of $B_2O_3:Na_2O$ with and/or without $Al_2O_3$ is 2:1–6:1. When the glasses are outside the ranges set forth no substantial color changes are observed. Thus, as illustrated by the examples hereinbelow, glasses in which the ratio is too low do not change in color from yellowish green to bluish green; whereas glasses in which the ratio is too high are initially bluish green.

Of course the glass composition can be modified to a minor extent by the addition of small amounts of up to about 5% by weight of certain other oxides, such as metal oxide, e.g. PbO, ZnO, CaO, and BaO. Furthermore, it has been found particularly advantageous for fining purposes to add small amounts of up to about 1.0 weight percent $Sb_2O_3$. Small amounts up to about 0.1 percent by weight of other coloring agents may be added to produce minor modifications of the chromaticity of the resulting glass. These include the oxides of cobalt, nickel, iron, and copper.

Figure 2:
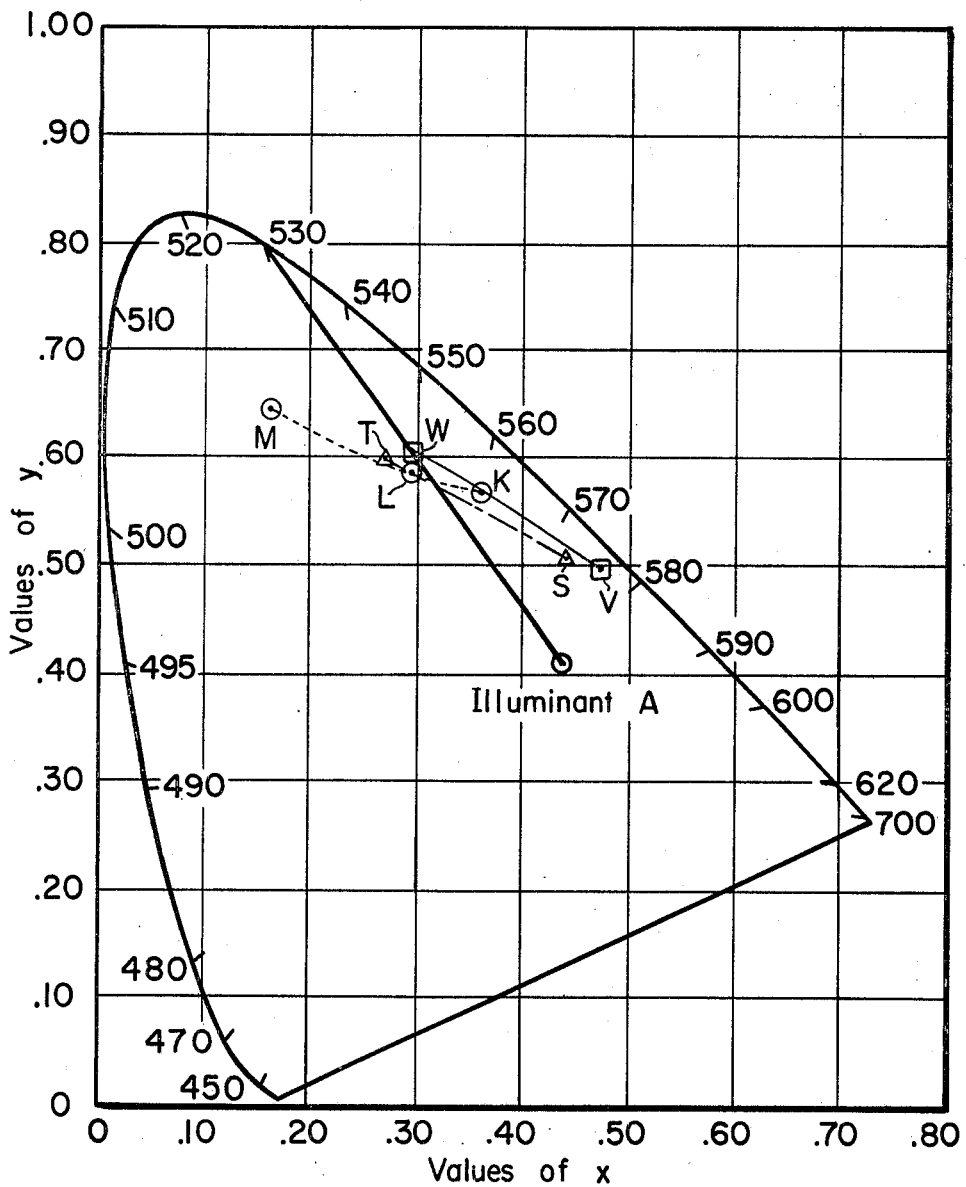
FIGURE 2 is a chromaticity diagram using the I.C.I. system which graphically illustrates the color changes produced by the method described herein.

The change in color of the chromic oxide containing borosilicate glasses by our novel method is graphically illustrated by FIGURE 2, which is a chromaticity diagram using the I.C.I. systems. The line which extends from Standard Illuminant A to the point marked 530 millimicrons is defined herein as the color boundary such that the points plotted to the left of the line are designated as bluish green and those to the right of the line are designated as yellowish green. It is not necessary to define how closely the color of the glasses approaches the other extremity, namely yellow or blue, since the glasses under consideration are predominately within some intermediate green shade.

The chromic oxide containing borosilicate glass composition discussed hereinabove is conventionally melted at temperatures of for example 1450–1550° C. The molten glass is then formed or pressed to the desired shape such as a PAR lens. Initially the color of the glass is yellowish green and would heretofore have been unacceptable and discarded.

It is now by subjecting the glass to our special post-forming heat treatment that the color is changed to bluish green. The temperature of the treatment ranges from about or even slightly below the annealing point of the glass up to or slightly below the softening point of the glass. While these temperatures will vary to some extent with the glass composition we have determined that the temperature range is generally about 525–750° C. The color change which occurs in the glass is not only a function of temperature alone, but also the time during which the heating is maintained. Generally, the effective heating time is in the range of 0.1–100 hours with the condition that the lower the temperature, the longer the time required to effect the desired color change. For example at a temperature of 525° C. it may be necessary to heat the glass for 50–100 hours. But for most glasses a temperature of about 600° C. for 1 hour or 750° C. for 10 minutes are quite adequate. Short heating periods are of course preferred from a commercial point of view.

The change in color of certain glasses in shown in FIGURE 2 by the line KLM, line ST and line VW which are more fully discussed in the examples below with regard to glass composition and heat treatment. In each of these glasses upon heat treatment the color of the glass underwent changes from yellowish green to bluish green. The simple situation is illustrated in the glasses initially having colors plotted as V and S which undergo changes upon heat treatment to colors plotted as W and T respectively. A more complex change is noted in the glass which initially had a color plotted as K which upon multiple heat treatments changed first to L and finally to M.

Subsequent to the heat treatment the glasses are annealed to remove any stress or strain remaining in the glasses. These can then be used to provide bluish-green lenses for the PAR lamps.

Our invention is further illustrated by the following examples.

EXAMPLES I–III

Using conventional techniques, the following glasses set forth on the oxide basis as calculated from the batch were prepared.

| | Mole percent | | |
|---|---|---|---|
| | Ex. I | Ex. II | Ex. III |
| $SiO_2$ | 80.31 | 80.28 | 80.11 |
| $B_2O_3$ | 13.22 | 13.32 | 12.93 |
| $Na_2O$ | 4.99 | 4.98 | 4.81 |
| $Al_2O_3$ | 1.20 | 1.21 | 1.01 |
| $Cr_2O_3$ | 0.16 | 0.16 | 0.11 |
| FeO | | | 0.01 |
| CoO | | 0.03 | |
| $Sb_2O_3$ | | | 0.14 |

| | Weight percent | | |
|---|---|---|---|
| $SiO_2$ | 78 | 78 | 78.80 |
| $B_2O_3$ | 15 | 15 | 14.75 |
| $Na_2O$ | 5 | 5 | 4.74 |
| $Al_2O_3$ | 2 | 2 | 1.70 |
| $Cr_2O_3$ | 0.4 | 0.4 | 0.30 |
| FeO | | | 0.053 |
| CoO | | 0.05 | |
| $Sb_2O_3$ | | | 0.70 |

| Physical properties | Ex. I | Ex. II | Ex. III |
|---|---|---|---|
| Softening Point, ° C | 794 | 794 | 780 |
| Annealing Point, ° C | 534 | 534 | 540 |
| Strain Point, ° C | 511 | 511 | 497 |
| Expansion ($\times 10^{-7}$/° C.) | 37.3 | 37.3 | 36 |

Samples selected from each of the glasses were then prepared for colorimetric measurements in accordance with the I.C.I. method using Standard Illuminant A. The colors of the samples were determined initially and then the samples were placed in a lehr at specified temperatures and for various periods of time. The heat treatment of these samples and the effect of the heat treatment are recorded in the table below.

| Glass | Thickness (mm.) | Heat treatment Time-Temp. | Value of x | Value of y | Y |
|---|---|---|---|---|---|
| Ex. I | 2.03 | None | .4742 | .4928 | 27.7 |
| | 2.03 | 650° C.-1 hr | .4528 | .5058 | 23.9 |
| | 2.03 | 700° C.-10 min | .3305 | .5850 | 13.8 |
| | 2.03 | 750° C.-10 min | .3057 | .6050 | 11.8 |
| Ex. II | 2.05 | 525° C.-30 min | .4416 | .5035 | 23.5 |
| | 2.01 | 750° C.-10 min | .2754 | .5948 | 10.7 |
| Ex. III* | 3.98 | None | .3692 | .5645 | 11.90 |
| | 3.98 | 600° C.-30 min | .2995 | .5832 | 8.33 |
| | 3.98 | 700° C.-30 min | .1706 | .6440 | 4.25 |

*Samples heat treated successively and then lehred at 550° C. for 10 min.

The results obtained have been plotted graphically and are shown in FIGURE 2. The change in the color of glasses of Ex. I, Ex. II, and Ex. III are represented by line VW, line ST, and line KLM respectively. These clearly show that upon heat treatment the color of the glasses shifts to left from yellowish green to bluish green.

EXAMPLE IV

Following the procedure of Example I, samples of glass were prepared to determine the effect of composition on the change of color from yellowish green to bluish green. The compositions, the heat treatment and the color changes are set forth in the table below.

| Glass | Mole percent | | | | | Heat treatment | |
|---|---|---|---|---|---|---|---|
| | $SiO_2$ | $B_2O_3$ | $Na_2O$ | $Al_2O_3$ | $Cr_2O_3$ | None | 750° C.-10 min. |
| A | 90.90 | | 7.83 | 1.20 | .16 | Yellow green | Yellow green. |
| B | 89.34 | 4.38 | 4.92 | 1.20 | .16 | do | Do. |
| C | 84.86 | 8.82 | 4.96 | 1.20 | .16 | do | Do. |
| D | 80.31 | 13.22 | 4.99 | 1.20 | .16 | do | Blue green. |
| E | 75.69 | 17.90 | 5.03 | 1.22 | .16 | do | Do. |
| F | 71.01 | 22.53 | 5.06 | 1.23 | .16 | Blue green | Do. |
| G | 66.27 | 27.23 | 5.10 | 1.24 | .16 | do | Do. |
| H | 61.45 | 32.00 | 5.14 | 1.25 | .17 | do | Do. |
| I | 56.57 | 36.84 | 5.17 | 1.26 | .17 | do | Do. |

These results are shown graphically in FIGURE 1 in the area enclosed by ABED. The shift in color is obtained, in the presence of minor amounts of $Al_2O_3$, when the $B_2O_3$ to $Na_2O$ ratio is in the range of 2:1 to 4:1 as illustrated by glasses D and E. When the ratio of $B_2O_3$ to $Na_2O$ is less than about 2:1 the glass remains yellowish green as illustrated by glasses A, B, and C, while when the ratio is greater than about 4:1 the $Al_2O_3$ containing glass is initially within the bluish-green color range as illustrated by glasses F, G, H, and I.

We claim:

1. A method of making a bluish-green chromic oxide containing borosilicate glass, comprising forming a glass consisting essentially as calculated from the batch on the oxide basis of

| | Mole percent |
|---|---|
| $Na_2O$ | 4.5–10 |
| $B_2O_3$ | 10–40 |
| $SiO_2$ | 50–85 |
| $Al_2O_3$ | 0–4.4 |
| $Cr_2O_3$ | 0.08–0.24 | wherein the molar ratio of $B_2O_3$ to $Na_2O$ is in the range of 2:1 to 6:1, said glass having an initial yellowish-green color, and subjecting the glass to a post-forming heat treatment at a temperature between about the annealing point and the softening point of the glass for a time sufficient to change the color to a bluish green.

2. The method of claim 1, wherein said heat treatment is at a temperature of 525–750° C. for a time of 0.1–100 hours.

3. A method of changing the color of chromic oxide-containing glasses from yellowish green to bluish green comprising the steps of:

(a) melting a glass consisting essentially as calculated from the batch on the oxide basis of

| | Mole percent |
|---|---|
| $Na_2O$ | 4.5–10 |
| $B_2O_3$ | 10–40 |
| $SiO_2$ | 50–85 |
| $Al_2O_3$ | 0–4.4 |
| $Cr_2O_3$ | 0.08–0.24 | wherein the molar ratio of $B_2O_3$ to $Na_2O$ is in the range of 2:1 to 6:1, said glass having an initial color of yellowish green;

(b) forming the glass into a shaped article;

(c) subjecting the article to a post-forming heat treatment at a temperature of 525–750° C. for a time of 0.1–100 hours whereby the color of the glass is changed to bluish green, and (d) annealing said article.

4. The method of claim 3, wherein said glass additionally contains up to about 1.0% by weight of $Sb_2O_3$.

5. The method of claim 3, wherein said glass additionally contains up to about 5% by weight of other oxides selected from the group consisting of PbO, ZnO, CaO, and BaO.

6. The method of claim 3, wherein said glass additionally contains up to about 0.1% by weight of other coloring oxides selected from the group consisting of the oxides of cobalt, nickel, iron and copper.

7. The method of claim 3, wherein said glass contains a small amount of $Al_2O_3$ up to about 4.5 mole percent and the molar ratio of $B_2O_3:Na_2O$ is in the range of about 2:1–4:1.

8. The method of claim 3, wherein $Al_2O_3$ is substantially absent and the molar ratio of $B_2O_3:Na_2O$ is in the range of about 3:1–6:1.

9. The method of claim 3 for making a bluish-green PAR lamp lens comprising the steps of:

(a) melting a glass consisting essentially as calculated from the batch on the oxide basis of about

| | Mole percent |
|---|---|
| $SiO_2$ | 80.11 |
| $B_2O_3$ | 12.93 |
| $Na_2O$ | 4.81 |
| $Al_2O_3$ | 1.01 |
| $Cr_2O_3$ | 0.11 |
| FeO | 0.01 |
| $Sb_2O_3$ | 0.14 | said glass having an initial yellowish-green color, (b) forming the glass into said lens, (c) subjecting the lens to a heat treatment at a temperature of 525–750° C. for a time of about 0.1–100 hours whereby the color of said glass changes to bluish green, and (d) annealing the glass.

References Cited

UNITED STATES PATENTS 2,209,907 7/1940 Tarr _____ 106—302 XR
2,974,052 7/1960 Bacon et al.

S. LEON BASHORE, Primary Examiner

JOHN H. HARMAN, Assistant Examiner

U.S. Cl. X.R.

106—52, 302